United States Patent [19]

Sellinger

[11] 4,266,683
[45] May 12, 1981

[54] OUTDOOR JUNCTION BOX

[75] Inventor: Martin S. Sellinger, Livingston, N.J.

[73] Assignee: Keene Corporation, New York, N.Y.

[21] Appl. No.: 120,684

[22] Filed: Feb. 11, 1980

Related U.S. Application Data

[63] Continuation of Ser. No. 942,930, Sep. 18, 1978, abandoned.

[51] Int. Cl.³ .............................................. H02G 3/08
[52] U.S. Cl. .................................. 220/3.2; 174/65 R; 174/65 G
[58] Field of Search .................... 220/3.3, 3.4, 3.5, 3.6; 174/58, 65 G, 65 R; 248/DIG. 8

[56] References Cited

U.S. PATENT DOCUMENTS 2,628,264   2/1953   Esher .................................. 174/65 R

FOREIGN PATENT DOCUMENTS 1094841 12/1953 Fed. Rep. of Germany .
1074697  4/1955 Fed. Rep. of Germany .
1042065 10/1955 Fed. Rep. of Germany .
 396135  7/1965 Switzerland .

Primary Examiner—Joseph Man-Fu Moy
Attorney, Agent, or Firm—Gerald Levy

[57] ABSTRACT

An improved electrical junction box particularly suitable for outdoor use is provided. The junction box contains a plurality of mounting holes each of which is closed by a grommet. The mounting holes are defined within lugs having raised and depending portions with a flange extending therebetween. The grommet is provided with a circumferentially extending groove into which the lug flange seats. Counterbores extend from the top and bottom end of the grommet terminating short of each other whereby to define a web section. The grommet groove extends about the web.

1 Claim, 3 Drawing Figures

OUTDOOR JUNCTION BOX

This is a continuation of application Ser. No. 942,930, filed Sept. 18, 1978, now abandoned.

BACKGROUND OF THE INVENTION

The present invention relates to electrical junction boxes and in particular to an improved mounting system for such a box.

Heretofore, electrical junction boxes have conventionally been formed with a plurality of external lugs provided at various locations and/or internal weakened sections defining a "knockout" which could readily be removed. In use, an installer knocks out the weakened section of the lug in the field and then passes a fastener through the resulting opening to secure the box in place. Since the box must be capable of being mounted to a wide variety of surfaces with different types of fasteners, the resultant opening must be sufficiently large to accommodate the largest fastener that may be used.

In many applications the above presents a problem in that the opening may be sufficiently larger than the fastener to permit moisture to enter into the junction box. This poses a special problem where the box is used out of doors.

In view of the above, it is the principal object of the present invention to provide an improved junction box construction wherein the mounting openings are designed to engage an associated fastener in a moisture-tight fit regardless of the size of the fastener.

A further object of this invention is to provide a device which is relatively easy to manufacture, can accommodate a wide range of fasteners, and which may readily and easily be mounted to all types of wall surfaces.

A further object of this invention is to eliminate the need for external mounting lugs so that boxes can be mounted close together and the cost of the lugs is eliminated.

SUMMARY OF THE INVENTION

The above and other beneficial objects and advantages are attained in accordance with the above by providing a junction box at least one wall of which contains therein at least one mounting opening passing therethrough. The opening is closed by an elastomeric grommet. The grommet has counterbores which extend from both the interior and exterior sides of the wall. The counterbores do not meet but rather terminate in a web portion. The surface of the box surrounding the opening defines a hub which serves to constrain the grommet in position. In this connection, a groove is provided in the grommet periphery about the web and engages an inwardly directed flange positioned in the hub. The hub, flange and groove cooperate to prevent the grommet from distorting out of position when the grommet web is penetrated by a fastener to thereby ensure that the grommet will form a tight, moisture proof seal about the fastener and with the hub.

DETAILED DESCRIPTION OF THE PREFERRED EMBODIMENT

Figure 1:
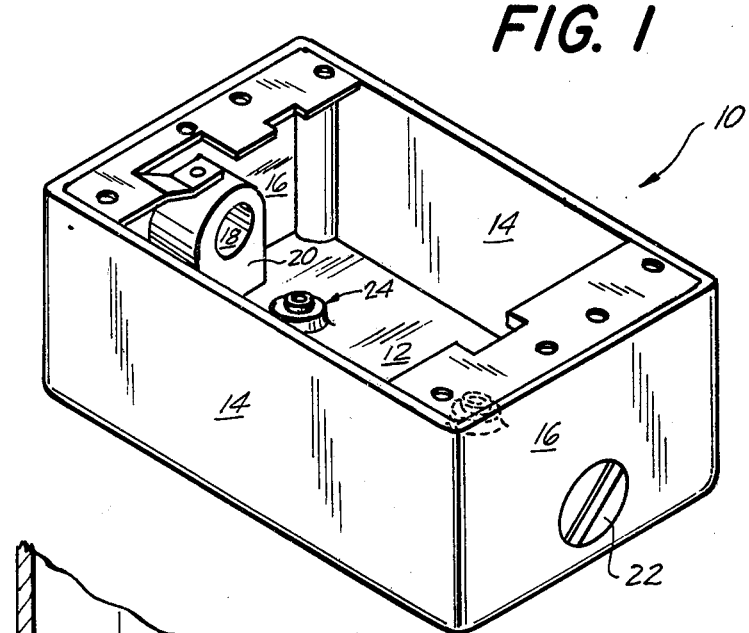
FIG. 1 is a perspective view of an electrical junction box in accordance with the present invention.

Reference is now made to the drawings and to FIG. 1 in particular wherein a junction box 10 in accordance with the present invention is depicted. The junction box comprises a generally rectangular housing having a base 12, side walls 14, end walls 16 and an open top opposite the base. Threaded openings 18 extend through lugs 20 in the end walls. The openings are covered by threaded caps 22. When the caps are removed, the openings 22 serve to receive electrical cable leads and thereby permit connection with a receptacle, switch or other fixture mounted within the junction box in a well known fashion.

In accordance with the present invention, a plurality of mounting lugs 24 extend through base 12. Each lug has an upper portion comprising a sleeve 26 extending into the interior or the box and a lower portion comprising a sleeve 28 extending exteriorally of the box. Surfaces of lug 24 define an opening 30 extending through the junction box.

Figure 2:
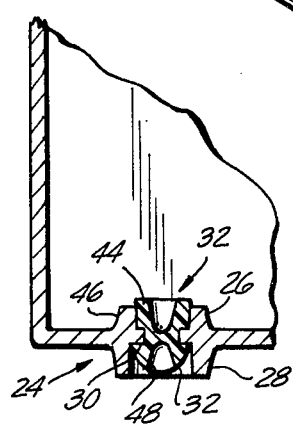
FIG. 2 is a fragmentary sectional view taken along reference lines 2—2 of FIG. 1; and, FIG. 3 is a fragmentary perspective view of the junction box mounting grommet and an associated fastener.
Figure 3:
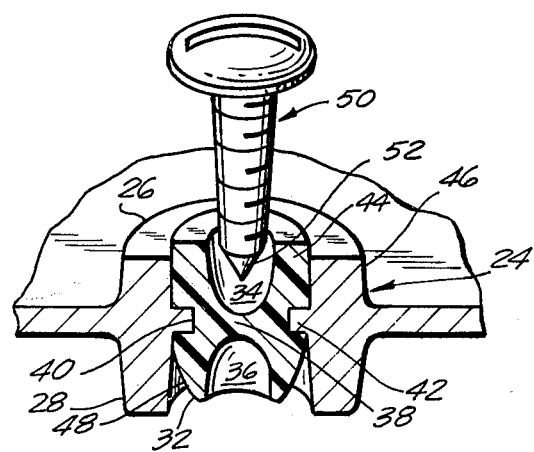

A grommet 32 extends through each opening 30. The grommet comprises an elongated generally cylindrical member formed of an elastomeric material such as rubber. A counterbore 34 extends downwardly from the top of the grommet 32. A similar counterbore 36 extends upwardly from the bottom of grommet 32. The two counterbores do not meet but stop short of each other thereby defining a web 38 within the grommet. A groove 40 extends circumferentially about the grommet at its approximate midpoint in line with web 38 dividing the grommet into an upper section and lower section. As shown in FIGS. 2 and 3, lug 24 is provided with an inwardly directed flange 42 which seats within groove 40 of the grommet.

As may also be noted in FIGS. 2 and 3, the upper section 44 of the grommet (i.e., the portion above groove 42) tightly engages the interior of the upper portion of lug 24 with the upper sleeve portion 26 of the lug defining a hub extending about the grommet upper section. The lower section 48 of the grommet (i.e., the portion below groove 40) is chamferred and thereby spaced apart from the lower sleeve portion 28 of the lug.

In use, the junction box is mounted by inserting a fastener 50 such as the round head screw shown in FIG. 3 through the grommet to engage a wall or other mounting surface. As the head 52 of screw 50 penetrates counterbore 34, it forces the upper section of the grommet tightly against the upper portion 46 of lug 26 thereby creating a tight seal. At the same time, the portions of the web penetrated by the threaded portion of the screw tightly engaged the screw threads continuing the seal.

Because of hub 46, the grommet is prevented from expanding outwardly. The groove 40 and flange 42 cooperate to prevent the grommet from twisting as the screw is tightened. The counterbores 34 and 36 prevent a "squatting" action of the grommet whereby the grommet could be squeezed out of the opening.

Thus, by means of the above, the junction box may easily and conveniently be mounted in a water-tight manner to an appropriate mounting surface. Any mounting hole not used, would remain sealed by its associated grommet serving as a plug.

Accordingly, the above mentioned objects and advantages are effectively attained.

Having thus described the invention, what is claimed is:

1. An electrical junction box comprising:

a generally rectangular housing formed of interconnected walls, at least one of said walls having surfaces defining a mounting opening extending therethrough;

said one wall including a lug surrounding said mounting opening, said lug having a first elongated sleeve portion extending into the box interior, a second elongated sleeve portion extending away from the box interior, and an inwardly flange interposed between said portion, said lug first and second sleeve portions including passageways extending therethrough communication with said openings; and, an elastomeric grommet positioned in and closing said opening; said grommet comprising an elongated member having a first section in sealing engagement with said lug first sleeve portion, a second section extending into said lug second sleeve portion chamferred so as not to engage said lug second sleeve portion along the length thereof, and a web section interconnecting said first and second sections and integral therewith;

said web being defined by counterbores extending into said grommet first and second sections terminating short of each other; and a groove extending about said grommet web section, said lug flange being tightly seated within said web groove.

* * * * *